US009078081B2

(12) United States Patent
Yang et al.

(10) Patent No.: US 9,078,081 B2
(45) Date of Patent: Jul. 7, 2015

(54) MOBILE TERMINAL AND METHOD FOR SERVICE PROCESSING THEREOF

(75) Inventors: Rui Yang, Beijing (CN); Chunlei Zhao, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 13/641,543

(22) PCT Filed: Apr. 7, 2011

(86) PCT No.: PCT/CN2011/072504
§ 371 (c)(1),
(2), (4) Date: Oct. 16, 2012

(87) PCT Pub. No.: WO2011/127795
PCT Pub. Date: Oct. 20, 2011

(65) Prior Publication Data
US 2013/0035073 A1   Feb. 7, 2013

(30) Foreign Application Priority Data

Apr. 16, 2010   (CN) .......................... 2010 1 0152180

(51) Int. Cl.
*H04W 4/12*       (2009.01)
*H04W 60/00*      (2009.01)
(Continued)

(52) U.S. Cl.
CPC .............. *H04W 4/001* (2013.01); *H04W 88/02* (2013.01); *H04W 4/12* (2013.01)

(58) Field of Classification Search
CPC ................................................... H04W 8/245
See application file for complete search history.

(56) References Cited

U.S. PATENT DOCUMENTS

2008/0052026 A1* 2/2008 Amidon et al. ............... 702/104
2009/0061934 A1   3/2009 Hauck et al.
(Continued)

FOREIGN PATENT DOCUMENTS

CN       1905604      1/2007
CN     101022576      8/2007
(Continued)

OTHER PUBLICATIONS

PCT/CN2010/072504 International Preliminary Report on Patentability dated Oct. 16, 2012 (5 pages).
(Continued)

*Primary Examiner* — Vladimir Magloire
*Assistant Examiner* — Frank Donado
(74) *Attorney, Agent, or Firm* — Brinks Gilson & Lione; G. Peter Nichols

(57) ABSTRACT

A mobile terminal and a method for service processing thereof are provided in the present invention. The mobile terminal includes a determining module for determining whether the first service needs to be opened and obtaining a determining result; a register information collecting module for collecting the first register information used for opening the first service when said determining result indicates that the first service needs to be opened; a first transmission module for transmitting a first register request comprising first register information to the first server by using a communication module to request for opening the first service; a first receiving module for receiving the service setting information by using the communication module; and a setting module for setting the first service module according to the service setting information.

11 Claims, 3 Drawing Sheets

(51) Int. Cl.
*H04W 4/00* (2009.01)
*H04W 88/02* (2009.01)

(56) References Cited

U.S. PATENT DOCUMENTS

| | | |
|---|---|---|
| 2010/0029247 A1 | 2/2010 | De Atley et al. |
| 2010/0091965 A1 | 4/2010 | Ma et al. |
| 2010/0311444 A1* | 12/2010 | Shi et al. .................... 455/466 |

FOREIGN PATENT DOCUMENTS

| | | |
|---|---|---|
| CN | 101277182 | 10/2008 |
| CN | 101459908 | 6/2009 |
| WO | WO 2009/029156 | 3/2009 |

OTHER PUBLICATIONS

PCT/CN2011/072504 International Search Report dated Jul. 14, 2011 (2 pages).

First Office Action dated Apr. 18, 2013 in corresponding Chinese priority application No. 201010152180.7 filed Apr. 16, 2010 (12 pages including English translation).

Second Office Action dated Jan. 6, 2014 in corresponding Chinese priority application No. 201010152180.7 filed Apr. 16, 2010 (15 pages including English translation).

Third Office Action dated Aug. 19, 2014 in corresponding Chinese priority application No. 201010152180.7 filed Apr. 16, 2010 (18 pages including English translation).

* cited by examiner

_(54) MOBILE TERMINAL AND METHOD FOR SERVICE PROCESSING THEREOF_

This application claims priority to International Application No. PCT/CN2011/072504 filed on Apr. 7, 2011 and to CN 201010152180.7 filed on Apr. 16, 2010, the entire contents of which are incorporated herein by reference.

TECHNICAL FIELD

The present disclosure relates to the field of mobile communications, especially to a mobile terminal and a method for service processing thereof.

BACKGROUND ART

In general, mobile communication operators provide mobile mailboxes to the users to keep their advantages in the industry chain. Take the Chinese operators as an example, China Mobile provides 139 mailbox, China Unicom provides WO mailbox, and China Telecom provides 189 mailbox.

However, currently, only a few users use the mobile mailbox despite of the huge number of mobile users. During the implementation of the embodiments of the present disclosure, the inventor found out that the method of applying for the provisioning of the mobile mailbox in the related art has at least the disadvantage of low efficiency, thus the user needs to spend a lot of time. The detailed explanations are as follows.

In the method of applying for the provisioning of the mobile mailbox in the related art, at least four steps are necessary, and it takes about 3-5 minutes when the mailbox has not been provisioned. If there are some failures of the wireless network, it takes more time. As a result, the existing methods of applying for the provisioning of the mobile mailbox are of low efficiency, and cost a lot of user time.

The explanation above takes the provisioning of the mobile mailbox as an example. The same problem also exists when other mobile terminals apply for the provisioning of other services.

SUMMARY OF THE DISCLOSURE

One object of the present disclosure is to provide a mobile terminal and a method for service processing thereof, which can improve the efficiency of service provisioning and saving the user time.

To achieve the above object, a mobile terminal is provided in one embodiment of the present disclosure, comprising:

a communicating module;

a determining module for determining whether it is necessary to apply for a provisioning of a first service, to obtain a determination result;

a register information collecting module for collecting first register information used for the provisioning of the first service, when the determination result indicates that it is necessary to apply for the provisioning of the first service, wherein the first register information comprises an ID for identifying the mobile terminal uniquely;

a first transmitting module for transmitting a first register request comprising the first register information to a first server by using the communicating module, wherein the first register request is used to apply for the provisioning of the first service;

a first receiving module for receiving service setting information by using the communicating module, wherein the service setting information is returned by the first server after the first server provisions the first service according to the first register request; and a setting module for setting a first service module according to the service setting information, wherein the first service module is used to provide the first service through an interaction with a server corresponding to the first service.

The above mobile terminal further comprises a main board and a card slot connected to the main board.

The determining module is used particularly to determine whether there is a user identity module SIM card in the card slot.

The determining module determines that it is necessary to apply for the provisioning of the first service when there is the user identity module SIM card in the card slot.

The first service is a mailbox service, the service setting information is mailbox setting information, and the first service module is a mail client.

The above described mobile terminal further comprises a first saving module for saving transmitted register requests.

The determining module is used to determine whether there is a register request for the provisioning of the first service in the transmitted register requests, to obtain the determination result.

The determination result indicates that it is necessary to apply for the provisioning of the first service when there is no register request for the provisioning of the first service in the transmitted register requests.

The above mobile terminal further comprises:

a second transmitting module for transmitting a second register request comprising a second register information to a second server by using the communicating module; and a second receiving module for receiving a list of services to be provisioned returned by the second server by using the communicating module, wherein a service required to be provisioned to the mobile terminal which is determined by the second server according to the second register information is recorded in the list of services to be provisioned.

The determining module is used particularly to determine whether the first service is in the list of services to be provisioned, to obtain the determination result. The determination result indicates that it is necessary to apply for the provisioning of the first service when the first service is in the list of services to be provisioned.

The second register information comprises at least the type of the mobile terminal or the ID for identifying the mobile terminal uniquely, and the list of services to be provisioned is determined by the second server according to the type or the ID.

The above mobile terminal further comprises:

a second transmitting module for transmitting a second register request comprising a second register information to a second server by using the communicating module;

a second receiving module for receiving a list of services to be provisioned returned by the second server by using the communicating module, wherein a service required to be provisioned to the mobile terminal which is determined by the second server according to the second register information is recorded in the list of services to be provisioned;

a third receiving module for receiving information indicating registered service returned by a third server, and marking the corresponding service flag in the list of services to be provisioned as having been registered.

The determining module is used particularly to determine whether the first service is in the list of services to be provisioned and whether the service flag of the first service is having been registered, to obtain the determination result.

The determination result indicates that it is necessary to apply for the provisioning of the first service when the first service is in the list of services to be provisioned and the service flag of the first service is not having been registered.

To achieve the above object, a service processing method for a mobile terminal is further provided in another embodiment of the present disclosure, comprising:

determining, by the mobile terminal, whether it is necessary to apply for a provisioning of a first service, to obtain a determination result;

collecting, by the mobile terminal, first register information used for the provisioning of the first service when the determination result indicates that it is necessary to apply for the provisioning of the first service, wherein the first register information comprises an ID for identifying the mobile terminal uniquely;

transmitting, by the mobile terminal, a first register request comprising the first register information to a first server, wherein the first register request is used to apply for the provisioning of the first service;

receiving, by the mobile terminal, service setting information returned by the first server, after the first server provisions the first service according to the first register request; and setting, by the mobile terminal, a first service module according to the service setting information, wherein the first service module is used to provide the first service through an interaction with a server corresponding to the first service.

A main board and a card slot connected to the main board are arranged in the mobile terminal, and the first service is a mailbox service. The mobile terminal obtains the determination result by determining whether there is a user identity module SIM card in the card slot, and determines that it is necessary to apply for the provisioning of the mailbox service when there is the user identity module SIM card in the card slot, wherein the service setting information is mailbox setting information, and the first service module is a mail client.

The above service processing method further comprises: saving, by the mobile terminal, transmitted register requests.

The mobile terminal obtains the determination result by determining whether there is a register request for the provisioning of the first service in the transmitted register requests, and determines that it is necessary to apply for the provisioning of the first service when there is no register request for the provisioning of the first service in the transmitted register requests.

The above service processing method further comprises:

transmitting, by the mobile terminal, a second register request comprising a second register information to a second server;

receiving, by the mobile terminal, a list of services to be provisioned returned by the second server, wherein a service required to be provisioned to the mobile terminal which is determined by the second server according to the second register information is recorded in the list of services to be provisioned;

The mobile terminal obtains the determination result by determining whether the first service is in the list of services to be provisioned, to obtain the determination result, and determines that it is necessary to apply for the provisioning of the first service when the first service is in the list of services to be provisioned.

The above service processing method further comprises:

transmitting, by the mobile terminal, a second register request comprising a second register information to a second server;

receiving, by the mobile terminal, a list of services to be provisioned returned by the second server by using the communicating module, wherein a service required to be provisioned to the mobile terminal which is determined by the second server according to the second register information is recorded in the list of services to be provisioned;

receiving, by the mobile terminal, information indicating registered service returned by a third server, and marking the corresponding service flag in the list of services to be provisioned as having been registered;

The mobile terminal obtains the determination result by determining whether the first service is in the list of services to be provisioned and whether the service flag of the first service is having been registered, and determines that it is necessary to apply for the provisioning of the first service when the first service is in the list of services to be provisioned and the service flag of the first service is not having been registered.

The embodiments of the present disclosure have the following effects.

In the embodiments of the present disclosure, once it is determined that it is necessary to apply for the provisioning of the first service, the register information used for the provisioning of the first service will be collected automatically and transmitted to the first server by the first register request to request for the first service. The first server provisions the first service according to the register information comprised in the register request, after receiving the register request, and returns to the mobile terminal the service setting information required for the first service. The mobile terminal may set the first service module arranged therein according to a certain rule, after receiving the service setting information, so that the first service module may provide the first service through an interaction with a server corresponding to the first service. The mobile terminal according to the embodiments of the present disclosure can apply for service provisioning without the involvement of the user (for example, input operation, confirmation operation, etc.), so that the efficiency of service provisioning is improved, and the user time is saved.

In the meantime, considering the service is provisioned automatically and configured automatically, people lack of related knowledge (such as old people, children, people knowing little about computer and communication knowledge, or people incapable of inputting due to knowledge structure or body function obstacle, etc.) can apply for service provisioning and use service easily, improving the service utilization.

The application of mobile mailbox can make the relationship between the operator and the user closer and enhance the customer loyalty to the operator. Users can use the mobile mailbox provided by the operator and enjoy the convenience it brings, so that users originally having no requirement for mobile mailbox or having no mobile mailbox can experience the mobile mailbox and some of the users will be guided to use related value added services.

DESCRIPTION OF THE EMBODIMENTS

In the mobile terminal and the method for service processing according to the embodiments of the present disclosure, the service is automatically provisioned by detecting automatically, interacting with the server automatically, acquiring setting information for setting the service module, and setting the service module in the mobile terminal automatically by using the setting information.

Figure 1:
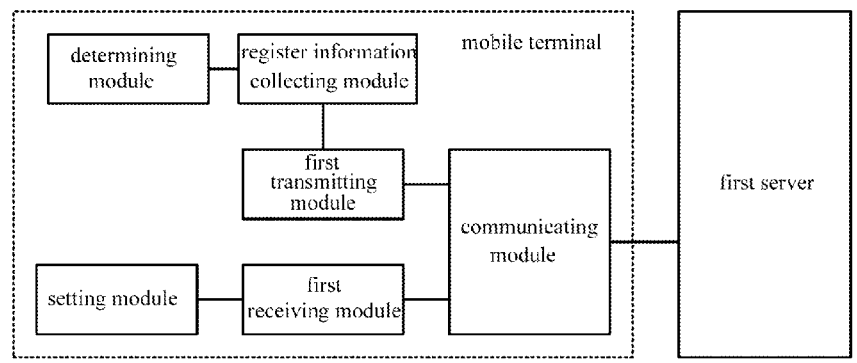
FIG. 1 is a structural schematic diagram of a mobile terminal according to an embodiment of the present disclosure.

As shown in FIG. 1, the mobile terminal according to an embodiment of the present disclosure comprises:

a communicating module;

a determining module for determining whether it is necessary to apply for a provisioning of a first service, to obtain a determination result;

a register information collecting module for collecting first register information used for the provisioning of the first service when the determination result indicates that it is necessary to apply for the provisioning of the first service, wherein the first register information comprises an ID for identifying the mobile terminal uniquely;

a first transmitting module for transmitting a first register request comprising the first register information to a first server by using the communicating module, wherein the first register request is used to apply for the provisioning of the first service;

a first receiving module for receiving service setting information by using the communicating module, wherein the service setting information is returned by the first server after the first server provisions the first service according to the first register request; and a setting module for setting a first service module according to the service setting information, wherein the first service module is used to provide the first service through an interaction with a server corresponding to the first service.

In the mobile terminal according to the embodiment of the present disclosure, once it is determined that it is necessary to apply for the provisioning of the first service, the first register information used for the provisioning of the first service will be collected automatically. Once the collection of the first register information is completed, the first register information is transmitted to the first server by the first register request to request for the provisioning of the first service.

The first server provisions the first service according to the register information comprised in the first register request, after receiving the first register request, and returns to the mobile terminal the service setting information required for the first service. The mobile terminal may set the first service module arranged therein according to a certain rule, after receiving the service setting information, so that the first service module may provide the first service through an interaction with a server corresponding to the first service. The server corresponding to the first service may be the first server, or alternatively may be any other server than the first server, as long as it can provide the first service.

It can be found out from the above processes that the mobile terminal according to the embodiment of the present disclosure can realize service provisioning automatically without the involvement of the user, and can complete the configuration of the mobile terminal locally, so that the efficiency of service provisioning is improved, and the user time is saved. In the meantime, considering the service provisioning is applied for automatically and configured automatically, people lack of related knowledge (such as old people, children, people knowing little about computer and communication knowledge, or people incapable of inputting due to knowledge structure or body function obstacle, etc.) can apply for service provisioning and use service easily, improving the service utilization.

Further, it can be found out from the above description that the embodiment of the present disclosure can achieve automatic provisioning of service even when only the communication module works normally, which lowers the hardware requirement when applying for service provisioning.

Further, since the above described processes (such as information collecting, transmitting, receiving, configuring etc.) are all processed by the mobile terminal automatically, time required for service provisioning shortens substantially, and it only needs a few seconds to finish the processes.

The above embodiment will be described below in more detail taking the provisioning of mailbox to a mobile phone as an example.

When the terminal is a mobile phone, the communication module is a wireless communication module, the mobile phone collects the register information for provisioning the mailbox service automatically when the subscription condition is met. The register information is information which may identify the mobile phone uniquely, for example, the mobile phone number or IMEI (International Mobile Equipment Identity).

The mobile phone transmits the mobile phone number or IMEI to the mailbox server after completing the collection of information, to request for the provisioning of mailbox service.

The mailbox service creates a mailbox for the user after receiving the register request comprising the mobile phone number or IMEI, and returning to the mobile phone the service setting information, such as the username, the password, the address of the mail receiving server, and the address of the mail transmitting server, etc.

The mobile phone may set the mail client according to the service setting information after receiving the same. When the setting is done, the mail client may interact with the mailbox server to provide the mail service to the user.

It can be found out that the provisioning process of the mobile phone mailbox service to the mobile phone does not need the involvement of the user, which can improve the efficiency of service provisioning and save the user time.

In the above described embodiment, the setting module sets the first service module according to the service setting information. The first service module may be the service module installed in the terminal.

When the terminal is not installed with the service module, the setting module may download the first service module and install the same automatically, and set the installed first service module according to the service setting information after the installation is completed.

Of course, when the terminal is not installed with the service module, the setting module may download the first service module and install the same automatically, and set the installed first service module according to the service setting information during the installation process. After the installation is completed, service may be provided by the first service module.

Of course, the first service module may also be a hardware device.

The above description has been made taking the provisioning of mailbox service to the mobile phone as an example.

Nevertheless, it should be understood that the above described mobile terminal may also a PDA, a notebook computer with a digital card, etc.

For any mobile terminal communicating by SIM card, it comprises a main board and a card slot connected to the main board. Specially, the determining module is used to determine whether there is a user identity module SIM card in the card slot. The determining module determines that it is necessary to apply for the provisioning of the first service when there is the user identity module SIM card in the card slot.

Therefore, with the above described solution, the above described service provisioning process can be started once the user identity module SIM card is detected in the card slot.

For different terminals, their parameters for identifying themselves uniquely may be the same or may be different with each other. For example, for a portable computer which may use a wired network, it may be identified by its IP address, its MAC (Media Access Control) address or other parameters identifying the terminal uniquely.

For different terminals, they may interact with the server by a wireless communication network or an existing wired network.

In the meantime, the above described service may also be other various services, such as a service for receiving information required by the user (such as the weather, the news or the sports, etc.) periodically. The only difference is the content of the service. A description will be made below taking the provisioning of the location service to the notebook computer as an example.

The notebook computer is arranged with a card slot for location service, and detects whether the location service card is inserted therein in real time. When it is detected that the location service card is inserted therein, information for registering the location service is collected and transmitted to a server, requesting for the provisioning of location service.

The receiving server corresponding to the notebook computer provisions the location service for the user according to the request for the provisioning of location service, and returns the service setting information for setting the location service card (such as the address of the e-map downloading server, the type of the mobile communication network (GPRS, WIFI, etc.) the access gateway, etc.). The notebook computer sets the location service card after receiving the service setting information. For example, the notebook computer sets the way of access as GPRS access at first, and then sets the GPRS access gateway, finally sets the address of the destination server. After the setting is completed, the location service card may interact with the e-map downloading server by accessing the destination address through the GPRS gateway, downloading the newest e-map, and providing the location service.

Of course, the location service card may also obtain the current longitude and latitude and transmit it to the server. The server carries out location and returns the location result. For example, the server may inform the user of the current address (C Avenue in B district, A city).

Of course, the above description is only an exemplary description. For different services to be provided, they need different register information to be transmitted, and different service setting information to be returned. Even for the same service, if the manners for providing the service are different, the returned service setting information may also be different. The detailed description is omitted here.

It can be found out that the above described mobile terminal may realize some service provisioning automatically when necessary to improve the efficiency of service provisioning and save the user time. However, in practice, it can be realized in various ways about which services in particular may be provisioned to the mobile terminal and when to trigger the process of applying for service provisioning.

Figure 2:
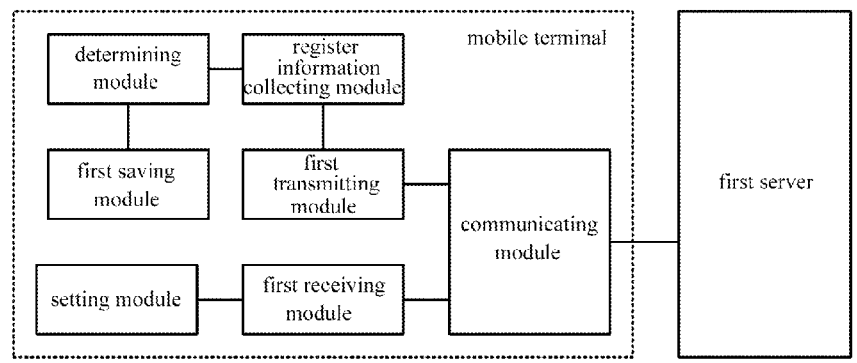
FIG. 2 is a structural schematic diagram of a mobile terminal according to another embodiment of the present disclosure.

In the above description, the process of applying for service provisioning will be triggered as soon as the first service provisioning is required to be applied for. However, the determination as to whether to apply for the provisioning of the first service may be determined to be positive at different timings. For example, for the above described provisioning process of mailbox service to the mobile phone, its preset trigger condition is that there is a SIM card in the card slot. However, if the user once took the SIM card out of the card slot and reinserted therein, it will be determined to apply for the provisioning of the mailbox service. Since the provisioning of the mailbox service has been applied for previously, obviously, the re-provisioning is an inefficient and unnecessary action. Considering this, to avoid the occurrence of this situation, as shown in FIG. 2, the mobile terminal according to the embodiment of the present disclosure further comprises a first saving module for saving transmitted register requests.

The determining module is used to determine whether there is a register request for the provisioning of the first service in the transmitted register requests, to obtain the determination result.

The determination result indicates that it is necessary to apply for the provisioning of the first service when there is no register request for the provisioning of the first service in the transmitted register requests.

By the above described configuration, when the transmitted register requests comprise a register request for the provisioning of the first service, it indicates that the first service has been requested to be provisioned previously. Since in general the service may be normally provisioned once being requested, requesting for provisioning the first service for another time is inefficient. Since the determination result indicates that the provisioning of first service is not to be applied for when the transmitted register requests comprise a register request for the provisioning of the first service, the subsequent opening process will not occur.

On the other hand, when the transmitted register requests do no comprise a register request for the provisioning of the first service, it indicates that the first service has not been requested to be provisioned previously. So the determination result indicates that it is necessary to apply for the provisioning of the first service and the subsequent processes will be carried out to achieve the provisioning of the first service.

In the particular embodiments of the present disclosure, it describes about how to achieve the provisioning of the service, but does not define which particular services are to be provisioned. It should be understood that the service required to be provisioned may be defined. A description will be made on one implementation of defining the service required to be provisioned.

Figure 3:
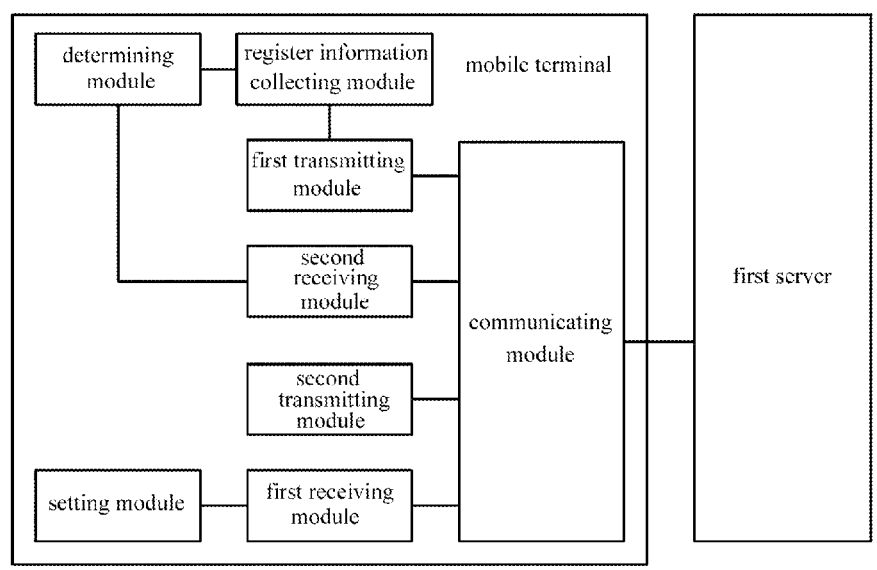
FIG. 3 is a structural schematic diagram of a mobile terminal according to still another embodiment of the present disclosure.

As shown in FIG. 3, in the implementation defining services required to be provisioned, the mobile terminal further comprises a second transmitting module for transmitting a second register request comprising a second register information to a second server by using the communicating module; and a second receiving module for receiving a list of services to be provisioned returned by the second server by using the communicating module, wherein a service required to be provisioned to the mobile terminal which is determined by the second server according to the second register information is recorded in the list of services to be provisioned.

In particular, the determining module is used to determine whether the first service is in the list of services to be provisioned, to obtain the determination result. The determination result indicates that it is necessary to apply for the provisioning of the first service when the first service is in the list of services to be provisioned.

Of course, the list of services to be provisioned may be set up at the server beforehand by the user, or may be realized in the following way.

The terminal transmits the type of the mobile terminal or the ID for identifying the mobile terminal uniquely, etc. in the second register information. The list of services to be provisioned is determined by the second server according to the type or the ID. The exemplary description is as follows.

If the terminal is a mobile phone, after the type of the mobile phone is transmitted, the second server determines service supported by such type as service to be provisioned, since different types of mobile phones have different functions and can support different services.

Of course, the service can be determined in the similar way for different terminals.

If the terminal is a mobile phone, the second server determines the service that can be provided to the user corresponding to the mobile phone number, as service to be provisioned, since users with different mobile phone numbers correspond to different service classes. For example, the user with number A can be provided with service A1 and A2, but the user with number B can only be provided with service A1. So the list of service to be provisioned corresponding to number A includes services A1 and A2, while the list of service to be provisioned corresponding to number B only includes services A1.

With the above configuration for the modules, when the first service is not included in the list, it indicates that the first service is not necessary to be provisioned, and the subsequent processes such as colleting, transmitting, receiving and setting are not to be carried out. When the first service is included in the list, it indicates that the first service is to be provisioned, and the subsequent processes such as colleting, transmitting, receiving and setting are to be carried out to realize the provisioning of the first service.

The way to control the first service to be provisioned automatically through the above described processes has been described above. However, there has been a case in which although the first service is in the list, it has been provisioned automatically in other terminals. In this case, the re-registration cannot be avoided in the way of recording the transmitted register requests. To avoid this situation, in the embodiments of the present disclosure, the first server or the terminal may further transmit the first register request to a third server, and the terminal of the present disclosure further comprises:

a second transmitting module for transmitting a second register request comprising a second register information to a second server by using the communicating module;

a second receiving module for receiving a list of services to be provisioned returned by the second server by using the communicating module, wherein a service required to be provisioned to the mobile terminal which is determined by the second server according to the second register information is recorded in the list of services to be provisioned;

a third receiving module for receiving information indicating registered service returned by a third server, and marking the corresponding service flag in the list of services to be provisioned as having been registered.

In particular, the determining module is used to determine whether the first service is in the list of services to be provisioned and whether the service flag of the first service is having been registered, to obtain the determination result.

The determination result indicates that it is necessary to apply for the provisioning of the first service when the first service is in the list of services to be provisioned and the service flag of the first service is not having been registered.

In the above way, even if the first service is in the list, the first service in the list will be recorded as having been registered once the other server returns an indication indicating that the first service has been registered. When the first service has been registered, the determination result will indicate that it is not necessary to apply for the provisioning of the first service, and the subsequent automatic provisioning process will not be carried out, and the inefficient register process will not be carried out repeatedly, so that a waste of resources can be avoided.

In the embodiments of the present disclosure, the interaction between the terminal and the server may be realized with the existing communication protocols, or with a private protocol supported by both the terminal and the server, or in any other way which is not defined here, as long as the server and the terminal are aware of the format of the interaction message.

For mobile communication terminals such as the mobile phone, the notebook computer with a digital card, the service setting information may be transferred by short message.

Of course, for the server side, if the service setting information transmitted to the terminal is lost (such as, during the transmission by short message), the server will discover that the user has on operation on the service in a certain time, and the server may retransmit the service setting information, so that the terminal may reset the service module after receiving the service setting information, until the service module works normally.

Of course, when the server discovers that the user has on operation on the service in a certain time, the server may also transmit a notification message to the terminal which presents it to the user to remind the user.

The above service provisioning process may be performed on an existing service, such as the mail service, to create a new account, or alternatively, may be performed to provide a specific new service to a specific user.

Of course, in the above described processes of the embodiments, although multiple transmitting modules and multiple receiving modules are described, it should be understood that all the transmitting or receiving functions on the terminal may be realized with one module. Similarly, the multiple servers described above may be the same server. In other words, processes on any one server of the first, second and third servers may be performed on any other server of the first, second and third servers.

Figure 4:
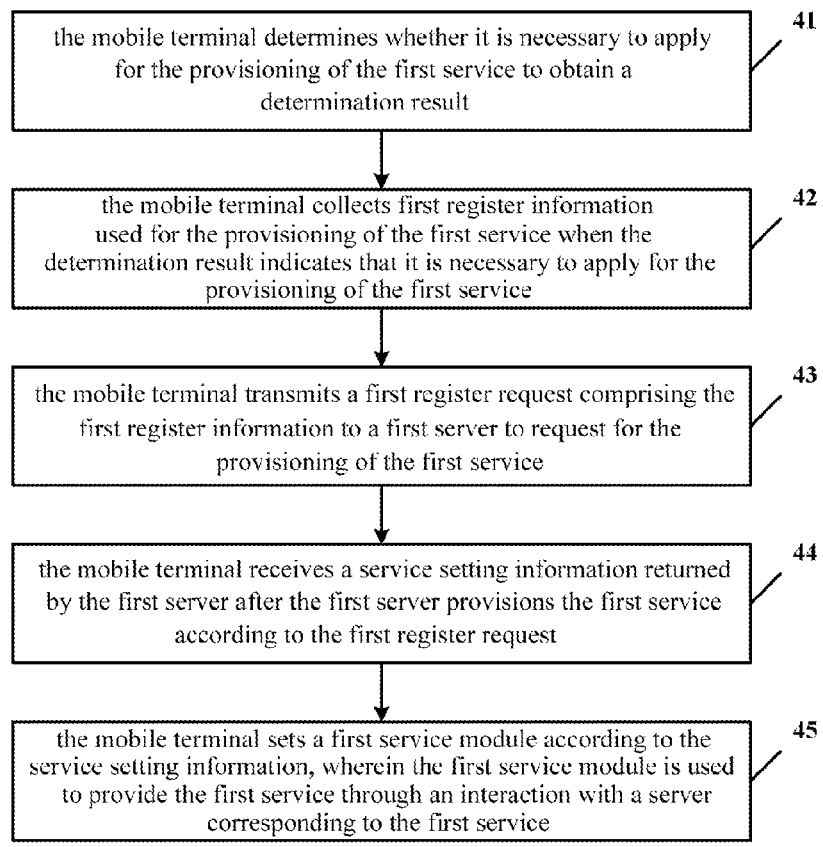
FIG. 4 is a flowchart diagram of a method for service processing according to an embodiment of the present disclosure.

As shown in FIG. 4, a service processing method for a mobile terminal according to an embodiment of the present disclosure comprises:

step 41, determining, by the mobile terminal, whether it is necessary to apply for a provisioning of a first service, to obtain a determination result;

step 42, collecting, by the mobile terminal, first register information used for the provisioning of the first service when the determination result indicates that it is necessary to apply for the provisioning of the first service, wherein the first register information comprises an ID for identifying the mobile terminal uniquely;

step 43, transmitting, by the mobile terminal, a first register request comprising the first register information to a first server, wherein the first register request is used to apply for the provisioning of the first service;

step 44, receiving, by the mobile terminal, service setting information returned by the first server, after the first server provisions the first service according to the first register request; and step 45, setting, by the mobile terminal, a first service module according to the service setting information, wherein the first service module is used to provide the first service through an interaction with a server corresponding to the first service.

A main board and a card slot connected to the main board are arranged in the mobile terminal. The first service is a mailbox service. The mobile terminal obtains the determination result by determining whether there is a user identity module SIM card in the card slot, and determines that it is necessary to apply for the provisioning of the mailbox service when there is the user identity module SIM card in the card slot, wherein the service setting information is mailbox setting information, and the first service module is a mail client.

The above described service processing method further comprises saving transmitted register requests by the mobile terminal.

The mobile terminal obtains the determination result by determining whether there is a register request for the provisioning of the first service in the transmitted register requests, and determines that it is necessary to apply for the provisioning of the first service when there is no register request for the provisioning of the first service in the transmitted register requests.

The above described service processing method further comprises: transmitting, by the mobile terminal, a second register request comprising a second register information to a second server by the mobile terminal; receiving, by the mobile terminal, a list of services to be provisioned returned by the second server, wherein a service required to be provisioned to the mobile terminal which is determined by the second server according to the second register information is recorded in the list of services to be provisioned. The mobile terminal obtains the determination result by determining whether the first service is in the list of services to be provisioned, to obtain the determination result, and determines that it is necessary to apply for the provisioning of the first service when the first service is in the list of services to be provisioned.

The above described service processing method further comprises: transmitting, by the mobile terminal, a second register request comprising a second register information to a second server; receiving, by the mobile terminal, a list of services to be provisioned returned by the second server by using the communicating module, wherein a service required to be provisioned to the mobile terminal which is determined by the second server according to the second register information is recorded in the list of services to be provisioned; receiving, by the mobile terminal, information indicating registered service returned by a third server, and marking the corresponding service flag in the list of services to be provisioned as having been registered. The mobile terminal obtains the determination result by determining whether the first service is in the list of services to be provisioned and whether the service flag of the first service is having been registered, and determines that it is necessary to apply for the provisioning of the first service when the first service is in the list of services to be provisioned and the service flag of the first service is not having been registered.

What described above are only some exemplary embodiments of the present disclosure. It should be noted that variations and modifications may be made without departing from the principle of the disclosure, and such variations and modifications shall be considered as falling into the scope of the present disclosure.

What is claimed is:

1. A mobile terminal, comprising:
a communicating module;
a determining module for determining whether it is necessary to apply for a provisioning of a first service, to obtain a determination result;
a register information collecting module for collecting first register information used for the provisioning of the first service when the determination result indicates that it is necessary to apply for the provisioning of the first service, wherein the first register information comprises an ID for identifying the mobile terminal uniquely;
a first transmitting module for transmitting a first register request comprising the first register information to a first server by using the communicating module, wherein the first register request is used to apply for the provisioning of the first service;
a first receiving module for receiving service setting information by using the communicating module, wherein the service setting information is returned by the first server after the first server provisions the first service according to the first register request, wherein the first service is a mailbox service, the service setting information is mailbox setting information, and the first service module is a mail client;
a second transmitting module for transmitting a second register request comprising a second register information to a second server by using the communicating module,
wherein the mobile terminal obtains the determination result by receiving information from a third server;
a third receiving module for receiving the information from the third server, including determining whether the first service is included in a list of services to be provisioned and whether a service flag of the first service included in the list of services has been marked as having been registered and determines, from the determination result, that it is necessary to apply for the provisioning of the first service;
a second receiving module for receiving a list of services to be provisioned returned by the second server by using the communicating module, wherein a service required to be provisioned to the mobile terminal which is determined by the second server according to the second register information is recorded in the list of services to be provisioned; and
a setting module for setting a first service module according to the service setting information, wherein a first service module is used to provide the first service through an interaction with a server corresponding to the first service.

2. The mobile terminal according to claim 1, further comprising a main board and a card slot connected to the main board;
wherein, the determining module is used to determine whether there is a user identity module SIM card in the card slot, to obtain the determination result;
the determination result indicates that it is necessary to apply for the provisioning of the first service when there is the user identity module SIM card in the card slot.

3. The mobile terminal according to claim 1, further comprising:
a first saving module for saving transmitted register requests;
wherein, the determining module is used to determine whether there is a register request for the provisioning of the first service in the transmitted register requests, to obtain the determination result;

the determination result indicates that it is necessary to apply for the provisioning of the first service when there is no register request for the provisioning of the first service in the transmitted register requests.

4. The mobile terminal according to claim 1, wherein the determining module is used to determine whether the first service is in the list of services to be provisioned, to obtain the determination result; and the determination result indicates that it is necessary to apply for the provisioning of the first service when the first service is in the list of services to be provisioned.

5. The mobile terminal according to claim 4, wherein, the second register information comprises at least the type of the mobile terminal or the ID for identifying the mobile terminal uniquely, and the list of services to be provisioned is determined by the second server according to the type or the ID.

6. The mobile terminal according to claim 1, further comprising:

a third receiving module for receiving information indicating registered service returned by a third server, and marking a corresponding service flag in the list of services to be provisioned as having been registered;

the determining module is used to determine whether the first service is in the list of services to be provisioned and whether a service flag of the first service is having been registered, to obtain the determination result;

the determination result indicates that it is necessary to apply for the provisioning of the first service when the first service is in the list of services to be provisioned and the service flag of the first service is not having been registered.

7. A service processing method for a mobile terminal, comprising:

determining whether it is necessary to apply for a provisioning of a first service, to obtain a determination result;

collecting first register information used for the provisioning of the first service when the determination result indicates that it is necessary to apply for the provisioning of the first service, wherein the first register information comprises an ID for identifying the mobile terminal uniquely;

transmitting a first register request comprising the first register information to a first server, wherein the first register request is used to apply for the provisioning of the first service;

receiving service setting information returned by the first server, after the first server provisions the first service according to the first register request, wherein the first service is a mailbox service, the service setting information is mailbox setting information, and the first service module is a mail client;

transmitting a second register request comprising a second register information to a second server, wherein the mobile terminal obtains the determination result by receiving information from a third server;

a third receiving module for receiving the information from the third server, including determining whether the first service is included in a list of services to be provisioned and whether a service flag of the first service included in the list of services has been marked as having been registered and determines, from the determination result, that it is necessary to apply for the provisioning of the first service;

receiving a list of services to be provisioned returned by the second server, wherein a service required to be provisioned to the mobile terminal which is determined by the second server according to the second register information is recorded in the list of services to be provisioned; and setting a first service module according to the service setting information, wherein the first service module is used to provide the first service through an interaction with a server corresponding to the first service, wherein the first service is a mailbox service, the service setting information is mailbox setting information, and the first service module is a mail client.

8. The service processing method according to claim 7, wherein a main board and a card slot connected to the main board are arranged in the mobile terminal; and the step of determining whether it is necessary to apply for the provisioning of the first service comprises:

obtaining the determination result by determining whether there is a user identity module SIM card in the card slot; and determining that it is necessary to apply for the provisioning of the mailbox service when there is the user identity module SIM card in the card slot.

9. The service processing method according to claim 7, further comprising:

saving transmitted register requests;

wherein, the step of determining whether it is necessary to apply for the provisioning of the first service comprises:

obtaining the determination result by determining whether there is a register request for the provisioning of the first service in the transmitted register requests; and determining that it is necessary to apply for the provisioning of the first service when there is no register request for the provisioning of the first service in the transmitted register requests.

10. The service processing method according to claim 7, further comprising:

wherein, the step of determining whether it is necessary to apply for the provisioning of the first service comprising:

obtaining the determination result by determining whether the first service is in the list of services to be provisioned, to obtain the determination result; and determining that it is necessary to apply for the provisioning of the first service when the first service is in the list of services to be provisioned.

11. The service processing method according to claim 7, further comprising:

receiving information indicating registered service returned by a third server, and marking a corresponding service flag in the list of services to be provisioned as having been registered;

wherein, the step of determining whether it is necessary to apply for the provisioning of the first service comprising:

obtaining the determination result by determining whether the first service is in the list of services to be provisioned and whether a service flag of the first service is having been registered; and determining that it is necessary to apply for the provisioning of the first service when the first service is in the list of services to be provisioned and the service flag of the first service is not having been registered.

* * * * *